(12) United States Patent
Walsh et al.

(10) Patent No.: US 9,038,128 B2
(45) Date of Patent: May 19, 2015

(54) APPLYING SECURITY CATEGORY LABELS TO MULTI-TENANT APPLICATIONS OF A NODE IN A PLATFORM-AS-A-SERVICE ENVIRONMENT

(75) Inventors: Daniel J. Walsh, Marlborough, MA (US); Michael P. McGrath, Schaumburg, IL (US)

(73) Assignee: Red Hat, Inc., Raleigh, NC (US)

( * ) Notice: Subject to any disclaimer, the term of this patent is extended or adjusted under 35 U.S.C. 154(b) by 369 days.

(21) Appl. No.: 13/408,729

(22) Filed: Feb. 29, 2012

(65) Prior Publication Data

US 2013/0227635 A1    Aug. 29, 2013

(51) Int. Cl.
G06F 17/00 (2006.01)
H04L 29/06 (2006.01)
G06F 9/455 (2006.01)
G06F 21/00 (2013.01)

(52) U.S. Cl.
CPC ............... G06F 9/455 (2013.01); G06F 21/00 (2013.01)

(58) Field of Classification Search
CPC . G06F 9/45537; G06F 9/45558; G06F 21/54; G06F 2009/45558; G06F 2009/45587
USPC ........................................................ 713/166
See application file for complete search history.

(56) References Cited

U.S. PATENT DOCUMENTS

| | | | |
|---|---|---|---|
| 6,009,452 A | 12/1999 | Horvitz | |
| 7,774,761 B2 | 8/2010 | Vohra | |
| 7,853,708 B2 | 12/2010 | Townsley et al. | |
| 8,352,941 B1 | 1/2013 | Protopopov et al. | |
| 8,356,274 B2 * | 1/2013 | Kwok et al. | 717/104 |
| 8,505,006 B1 * | 8/2013 | Larkin et al. | 718/1 |
| 8,635,351 B2 | 1/2014 | Astete et al. | |
| 2002/0091753 A1 | 7/2002 | Reddy et al. | |
| 2007/0128899 A1 | 6/2007 | Mayer | |
| 2008/0163004 A1 | 7/2008 | Yu | |
| 2008/0320474 A1 | 12/2008 | Jelinek et al. | |
| 2009/0313374 A1 | 12/2009 | Murphy et al. | |
| 2009/0313620 A1 | 12/2009 | Sedukhin et al. | |
| 2010/0122343 A1 | 5/2010 | Ghosh et al. | |
| 2010/0153951 A1 | 6/2010 | Jones | |
| 2010/0275241 A1 | 10/2010 | Srinivasan | |
| 2011/0055310 A1 | 3/2011 | Shavlik et al. | |
| 2011/0246617 A1 | 10/2011 | Sheehan et al. | |

(Continued)

OTHER PUBLICATIONS

Corcoran et al. Cross-tier, Label-based Security Enforcement for Web Applications. Jul. 2, 2009. SIGMOD. pp. 269-281.*

(Continued)

*Primary Examiner* — Dede Zecher
*Assistant Examiner* — Abdullah Almamun
(74) *Attorney, Agent, or Firm* — Lowenstein Sandler LLP

(57) ABSTRACT

A mechanism for applying security category labels to multi-tenant applications of a node in a PaaS environment is disclosed. A method of embodiments includes generating, by a virtual machine (VM), a unique security category label (SCL) for each local user identification (UID) maintained by the VM, assigning, for each local UID maintained by the VM, the unique SCL associated with the local UID to one or more Internet Protocol (IP) addresses mapped to the local UID, receiving a request to initialize an application on the VM, assigning a local UID of the local UIDs maintained by the VM to the application, assigning files of the application the unique SCL associated with the local UID of the application, and assigning the unique SCL associated with the local UID of the application to a running process of the application.

19 Claims, 6 Drawing Sheets

(56) References Cited

U.S. PATENT DOCUMENTS

| | | | |
|---|---|---|---|
| 2011/0252320 A1 | 10/2011 | Arrasvuori et al. | |
| 2011/0276584 A1 | 11/2011 | Cotner et al. | |
| 2011/0277027 A1* | 11/2011 | Hayton et al. | 726/8 |
| 2011/0302415 A1* | 12/2011 | Ahmad et al. | 713/168 |
| 2012/0011077 A1 | 1/2012 | Bhagat | |
| 2012/0096165 A1 | 4/2012 | Madduri et al. | |
| 2012/0173581 A1 | 7/2012 | Hartig et al. | |
| 2012/0185913 A1* | 7/2012 | Martinez et al. | 726/1 |
| 2012/0215919 A1 | 8/2012 | Labat et al. | |
| 2013/0007239 A1* | 1/2013 | Agarwal et al. | 709/223 |
| 2013/0055243 A1 | 2/2013 | Dandekar et al. | |
| 2013/0227560 A1 | 8/2013 | McGrath et al. | |
| 2013/0227561 A1 | 8/2013 | Walsh et al. | |
| 2013/0227563 A1 | 8/2013 | McGrath et al. | |
| 2013/0227635 A1 | 8/2013 | Walsh et al. | |
| 2013/0297672 A1 | 11/2013 | McGrath et al. | |
| 2013/0297673 A1 | 11/2013 | McGrath et al. | |
| 2013/0297685 A1 | 11/2013 | McGrath et al. | |
| 2013/0297795 A1 | 11/2013 | McGrath et al. | |
| 2013/0298183 A1 | 11/2013 | McGrath et al. | |
| 2014/0040883 A1 | 2/2014 | Tompkins, David | |

OTHER PUBLICATIONS

Morris, james. Filesystem Labeling in SELinux. Nov. 2004. Red Hat, Inc. pp. 1-8.*

Loscocco et al. Meeting Critical Security Objectives with Security-Enhanced Linux. 2004. NSA. pp. 1-11.*

Smalley. Stephen D. Introduction. Apr. 26, 2004. NSA. pp. 1-23.*

Authors et all. Apparatus and Method of Tenant Context Generation and Propagation in SaaS Environment. Aug. 19, 2010. IP.com. pp. 1-4.*

USPTO, Office Action for U.S. Appl. No. 13/461,705 mailed Jan. 30, 2014.

USPTO, Office Action for U.S. Appl. No. 13/461,712 mailed Feb. 27, 2014.

USPTO, Office Action for U.S. Appl. No. 13/408,754 mailed Jan. 16, 2014.

USTPO, Final Office Action for U.S. Appl. No. 13/408,754 mailed Jun. 4, 2014.

USPTO, Notice of Allowance for U.S. Appl. No. 13/461,584 mailed Jan. 29, 2014.

USPTO, Notice of Allowance for U.S. Appl. No. 13/461,584 mailed May 22, 2014.

USPTO, Office Action for U.S. Appl. No. 13/408,676 mailed Feb. 27, 2014.

USPTO, Office Action for U.S. Appl. No. 13/461,722 mailed Sep. 20, 2013.

USPTO, Final Office Action for U.S. Appl. No. 13/461,722 mailed Apr. 15, 2014.

The Authoritative Dictionary of IEEE Standards Terms. 2000, Standards Information Network IEEE Press. seventh edition. pp. 131 and 530.

Linux man page pam_namespace; htt://web.archive.org/web/20081014010639/http://linux.die.net/man/8/pam_nampespace; Oct. 14, 2008.

Red Hat Inc., Red Hat Enterpise Linux 5 Deployment guide, "Deployment, configuration and administration of Red Hat Enterprise Linux 5", Chapter 46—Security and SELinux, pp. 823-848, 26 pages, Jul. 21, 2011.

Unix man unshare clone Janak Desai, Jan. 11, 2006; p. 1-5.

Wiki LXC; http://web.archive.org/web/20120130164103/http://en.wikipedia.org/wiki/LXC; Jan. 30, 2012.

Maoke Chen and Akihiro Nakao, "Feather-Weight Network Namespace Isolation Based on User-Specific Addressing and Routing in Commodity OS," T. Magedanz et al. (EDS.): TridentCom 2010, LNICST 46, pp. 53-68, 2011.

An Quin et al., "Xconveryer: Guarantee Hadoop Throughput via Lightweight OS-level Virtualization," 2009 Eighth International Conference on Grid and Cooperative Computing, IEEE 2009, pp. 299-304.

Anup K. Ghosh and Angelos Stavrou, "Darpa Mobivisor: An Architecture for High Assurance for Untrusted Applications on Wireless Handheld Devices Via Lightweight Virtualization," Nov. 2010, 28 pages.

USPTO, Final Office Action for U.S. Appl. No. 13/461,705 mailed Aug. 7, 2014.

USPTO, Notice of Allowance for Applition No. 13/461,705 mailed Nov. 7, 2014.

USPTO, Office Action for U.S. Appl. No. 13/408,001 mailed Jul. 16, 2014.

USPTO, Advisory Action for U.S. Appl. No. 13/408,754 mailed Aug. 11, 2014.

USPTO, Office Action for U.S. Appl. No. 13/461,715 mailed Jul. 23, 2014.

USPTO, Notice of Allowance for U.S. Appl. No. 13/408,676 mailed Oct. 7, 2014.

* cited by examiner

APPLYING SECURITY CATEGORY LABELS TO MULTI-TENANT APPLICATIONS OF A NODE IN A PLATFORM-AS-A-SERVICE ENVIRONMENT

CROSS-REFERENCE TO RELATED APPLICATIONS

The present application is related to co-filed U.S. patent application Ser. No. 13/408,001 entitled "Mechanism for System Resource Sharing in a Multi-Tenant Platform-as-a-Service (PaaS) Environment in a Cloud Computing System"; co-filed U.S. patent application Ser. No. 13,408/754 entitled "Mechanism for Creating and Maintaining Multi-Tenant Applications in a Platform-as-a-Service (PaaS) Environment of a Cloud Computing System"; and co-filed U.S. patent application Ser. No. 13/408,676 entitled "Mechanism for Applying a Custom Security Type Label to Multi-Tenant Applications of a Node in a Platform-as-a-Service (PaaS) Environment"; which are all assigned to the assignee of the present application.

TECHNICAL FIELD

The embodiments of the invention relate generally to platform-as-a-service (PaaS) environments and, more specifically, relate to a mechanism for applying security category labels to multi-tenant applications of a node in a PaaS environment.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include such software components as a kernel and an operating system. Customers, that have installed and are executing their programs "in the cloud", typically communicate with the executing program from remote geographic locations using Internet protocols.

For programs that are web applications, the additional software can further include such software components as middleware and a framework. Web applications are programs that receive and act on requests in web or other Internet protocols, such as HTTP. It is common for a user to use a web application by using a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically should identify all of the software components that a web application needs in order to execute, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested to execute the web application instead or in addition on a different hypervisor and/or in a different particular provider's cloud. Also, it can be difficult to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings. PaaS offerings typically facilitate deployment of applications without the cost and complexity of buying and managing the underlying hardware and software and provisioning hosting capabilities, providing all of the facilities required to support the complete life cycle of building and delivering web application and service entirely available from the Internet. Typically, these facilities operate as one or more virtual machines (VMs) running on top of a hypervisor in a host server.

In present PaaS offerings, a first customer's deployed applications do not co-exist with any other customer's deployed applications on the VMs that are hosting the first customer's deployed applications. However, such an arrangement can be inefficient to the PaaS provider offering the platform services. This is because the applications being deployed in the PaaS are generally quite small packages, and the size of the VM does not correspond to the size of the application. It can be costly to initialize a new VM for each application deployment, and it may also be a waste of resources that are not being utilized. In a public cloud environment, a PaaS provider pays for deploying a VM whether the VM lies idle or not. In a private cloud environment, there is still a strain on resources for running VMs that are not completely utilized.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
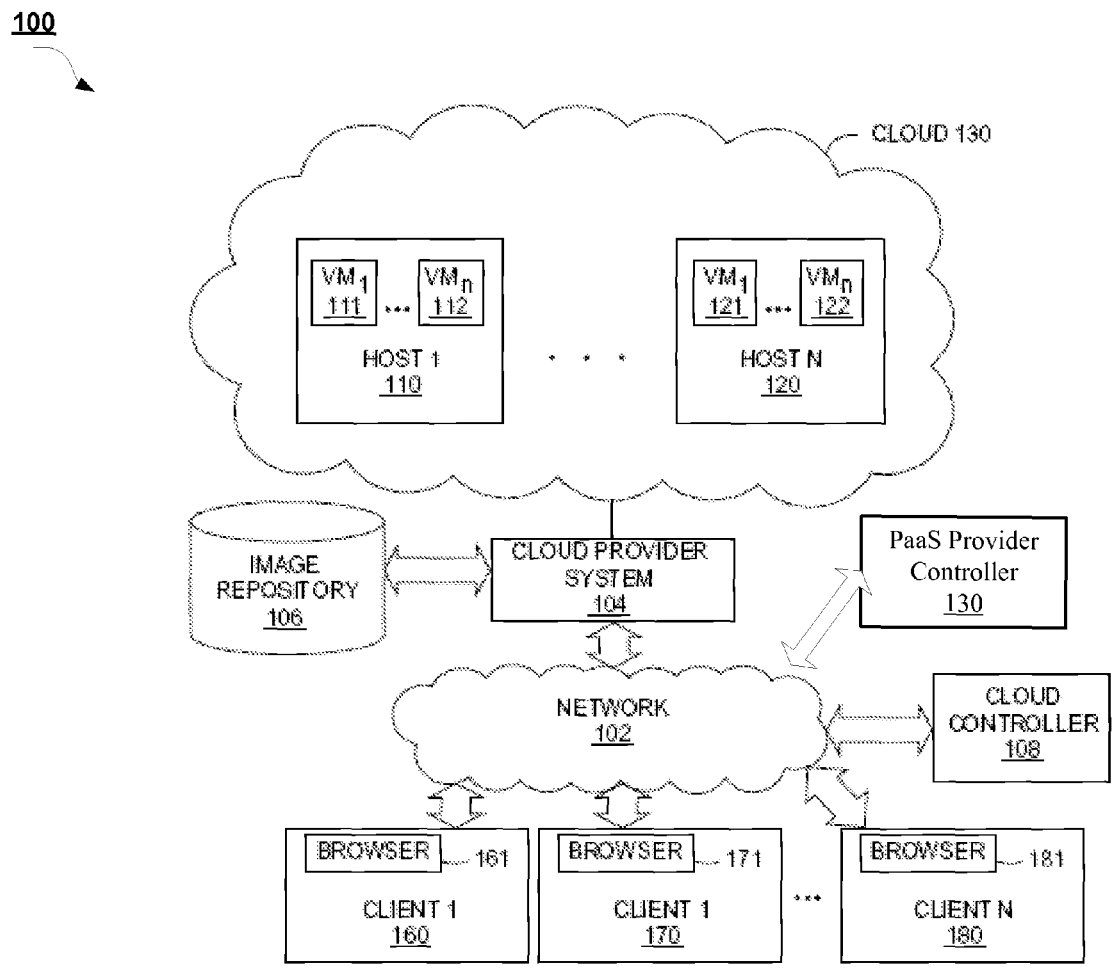
FIG. 1 is a block diagram of a network architecture in which embodiments of the invention may operate.

Embodiments of the invention provide a mechanism for applying security category labels to multi-tenant applications of a node in a PaaS environment. A method of embodiments of the invention includes generating, by a virtual machine (VM), a unique security category label (SCL) for each local user identification (UID) maintained by the VM, assigning, for each local UID maintained by the VM, the unique SCL associated with the local UID to one or more Internet Protocol (IP) addresses mapped to the local UID, receiving a request to initialize an application on the VM, assigning a local UID of the local UIDs maintained by the VM to the application, assigning files of the application the unique SCL associated with the local UID of the application, and assigning the unique SCL associated with the local UID of the application to a running process of the application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "applying", "identifying", "configuring", "establishing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for applying security category labels to multi-tenant applications of a node in a PaaS environment. In the multi-tenant PaaS environment, each node (i.e., virtual machine (VM)) in the PaaS environment runs multiple applications, and, as such, should provide security and separation to protect each of the multi-tenant applications from each other and to protect the underlying node (VM) from the multi-tenant applications. In one embodiment, unique security category labels are assigned to each application, including assigning the label to the files of the application, IP addresses used by the application, and the running process of the application. The node utilizes this unique label to enforce access permissions with respect to each application, in order to keep the multi-tenant applications running on a node separate from each other and unable to access the resources of each other.

FIG. 1 is a block diagram of a network architecture 100 in which embodiments of the invention may operate. The network architecture 100 includes a cloud 130 managed by a cloud provider system 104. The cloud 130 provides VMs, such as VMs 111, 112, 121, and 122. Each VM is hosted on a physical machine, such as host 1 110 through host N 120, configured as part of the cloud 130. In some embodiments, the host machines 110, 120 are often located in a data center. For example, virtual machines 111 and 112 are hosted on physical machine 110 in cloud 130 provided by cloud provider 104. Users can interact with applications executing on the cloud-based VMs 112, 112, 121, 122 using client computer systems, such as clients 160, 170 and 180, via corresponding web browser applications 161, 171 and 181.

Clients 160, 170 and 190 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 190 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 130. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS Provider Controller 130, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

In one embodiment, the PaaS provider controller 130 is operated by a PaaS provider that enables customers to create and run applications on nodes, e.g., VMs 111, 112, 121, 122, managed by the PaaS provider. In one embodiment, the nodes/VMs 111, 112, 121, 122 are hosted on computer hardware managed by the cloud provider system 104. In some embodiments, the VMs 111, 112, 121, 122 of the PaaS provider support multi-tenancy of applications running on the VMs 111, 112, 121, 122. This means that each VM 111, 112, 121, 122 can run multiple applications that may be owned or managed by different customers. Embodiments of the invention provide for security between these multi-tenant applications hosted on a VM 111, 112, 121, 122, as well as between the applications and the VM, by setting up each VM 111, 112, 121, 122 to utilize a security category label feature of an operating system (OS) of the VM 111, 112, 121, 122. The security category label feature creates a unique privilege level for resources of each application running on the VM 111, 112, 121, 112 that can only be granted to the running process of the application. This maintains a separation between the applications on the VM 111, 112, 121, 122 for security purposes.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
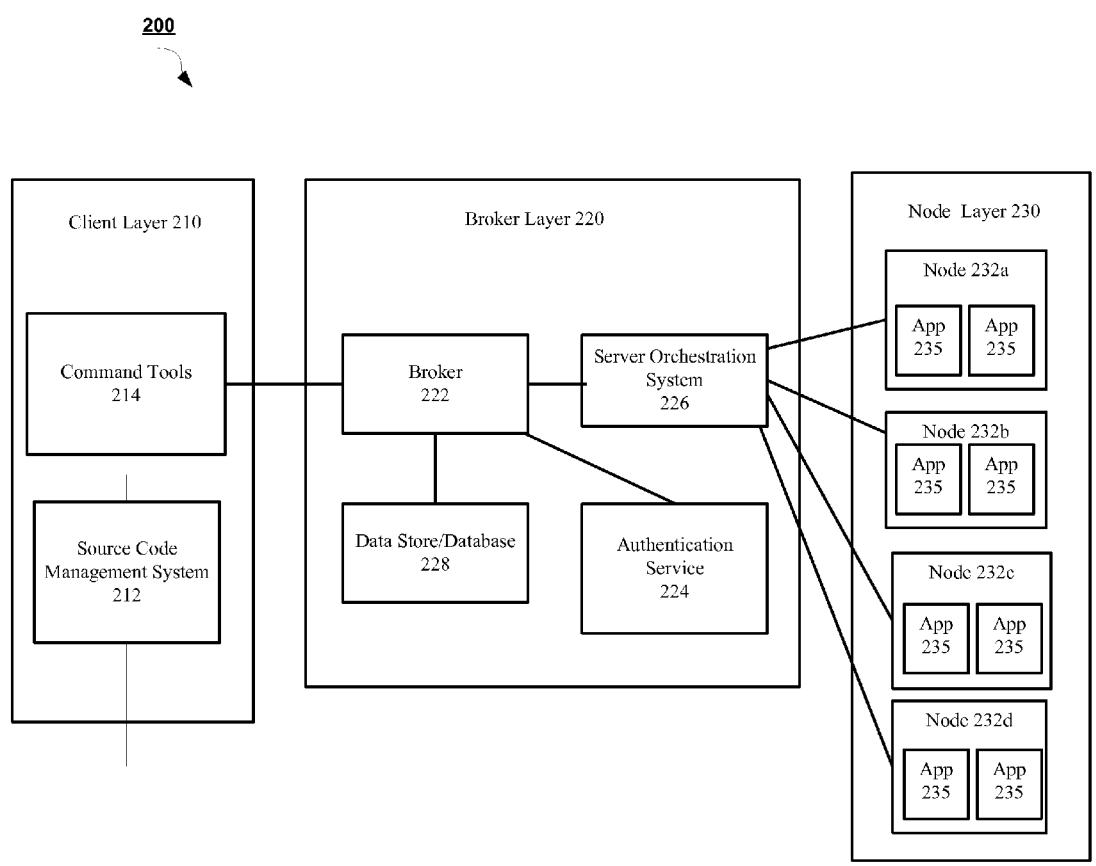
FIG. 2 is a block diagram of a PaaS system architecture according to an embodiment of the invention.

FIG. 2 is a block diagram of a PaaS system architecture 200. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface, to a user of the client machine, to the broker layer 220 of the PaaS system 200. For example, the broker layer 220 may facilitate the creation and deployment on the cloud (via node layer 230) of software applications being developed by an end user at client layer 210.

The client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232 on which software applications 235 are provisioned and executed. In one embodiment, each node 232 is a VM provisioned by an Infrastructure as a Service (IaaS) provider, such as Amazon™ Web Services. In other embodiments, the nodes 232 may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235, or some other action to manage the application 235, the broker 222 first authenticates the user using an authentication service 224. In one embodiment, the authentication service may comprise Streamline™, or may comprise some other authentication tool. Once the user has been authenticated and allowed access to the system by authentication service 224, the broker 222 uses a server orchestration system 226 to collect information and configuration information about the nodes 232.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232, which are acting as application servers and web servers.

For example, if the broker 222 wanted to shut down all applications 235 on all even numbered nodes out of 100,000 nodes, the broker 222 would only need to provide one command to the server orchestration system 226. Then, the server orchestration system 226 would generate a separate message to all nodes 232 to shut down all applications 235 if the node 232 is even, and distribute the messages to the nodes 232 using a messaging and queuing system. Thus, in one embodiment, the broker 222 manages the business logic and model representing the nodes 232 and the applications 235 residing on the nodes, and acts as a controller that generates the actions requested by users via an API of the client tools 214. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally-hosted database or file store, or it can be a cloud based storage service provided by a Storage-as-a-Service (SaaS) storage provider, such as Amazon™ S3™ (Simple Storage Service). The broker 22 uses the information about the nodes 232 and their applications 235 to model the application hosting service and to maintain records about the nodes. In one embodiment, node 232 data is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232 runs multiple applications 235 that may be owned or managed by different users and/or organizations. As such, a first customer's deployed applications 235 may co-exist with any other customer's deployed applications on the same node 232 (VM) that is hosting the first customer's deployed applications 235. This deployment of multiple applications 235 of multiple customers on a single node 232 (VM) is a cost-efficient solution for PaaS providers. However, deploying a multi-tenant PaaS solution raises a variety of concerns, including, for example, security. Specifically, security concerns exist in terms of separating multi-tenant applications 235 from each other, as well as separating multi-tenant applications 235 from the node 232 itself.

Embodiments of the invention provide for security between multi-tenant applications 235 hosted on node 232 by assigning a unique security category label to each application 235 started on the node 232. The unique security category label creates a privilege level for the application's 235 resources that can only be granted to the running process of the application 235. One embodiment of the interaction between the server orchestration system 226 and a node 232 to implement applying unique security category labels to multi-tenant applications on a single node in a PaaS environment is now described in more detail with reference to FIG. 3.

Figure 3:
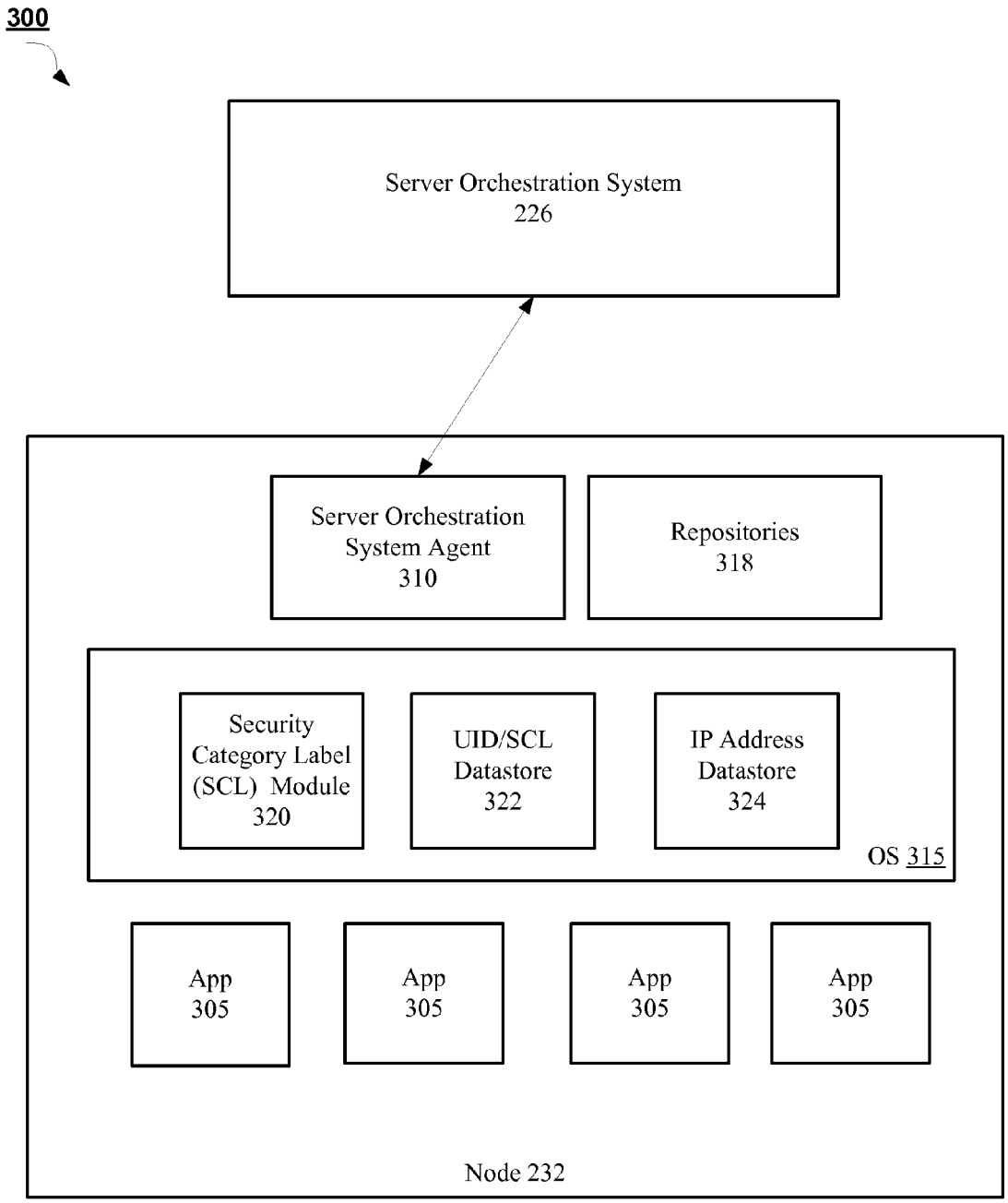
FIG. 3 is a block diagram of a communication infrastructure between a server orchestration system and a node according to embodiments of the invention.

FIG. 3 is a block diagram depicting a communication infrastructure 300 between a server orchestration system 225 and a node 232 according to embodiments of the invention. In one embodiment, server orchestration system 226 and node 232 are the same as their counterparts described with respect to FIG. 2. In one embodiment, node 232, which is implemented as a VM, has an operating system 315 that can execute applications 305 in the various software repositories 318 resident on the node 232. In one embodiment, applications 232 are the same as applications 235 described with respect to FIG. 2.

The node 232 also include a server orchestration system agent 310 configured to track and collect information about the node 232 and to perform actions on the node 232. Thus, in one embodiment, using MCollective™ as the server orchestration system 226, the server orchestration system agent 310 can be implemented as a MCollective™ server. The server orchestration system 226 would then be the MCollective™ client that can send requests, queries, and commands to the MCollective™ server on node 232.

In one embodiment, server orchestration system agent 310 interacts with OS 315 to apply unique security category labels to multi-tenant applications 305 that run on node 232. Specifically, a security category labeling feature of the OS 315 is utilized to provide security and separation for each multi-tenant application 305 running on the node 232. Generally speaking, a security category label (SCL) is a security enhancement to an OS, such as OS 315, that allows users to label files with categories. These categories may then be used to constrain the file and processes trying to access the file.

In one embodiment, a security category labeling is implemented using a Multi-Category Security (MCS) feature of SELinux™. SELinux™ is a security architecture integrated into the Linux™ OS kernel. SELinux provides a flexible Mandatory Access Control (MAC) system built into the Linux™ kernel. MCS is an enhancement to SELinux™, and allows users to label files with categories. Other security category labeling features from other OS vendors may also be utilized in embodiments of the invention as well.

In one embodiment, a SCL module 320 of OS 315 generates unique SCLs to be assigned to applications 305 of node 232 based on unique local user IDs (UID) maintained by OS 315. OS 315 maintains a set of unique local UIDs that are assigned to applications 305 as they are installed on the node 232. In one embodiment, SCL module 320 generates a set of unique SCLs by applying a transform to each unique local UID maintained by OS 315. In one embodiment, the generation of an SCL for each unique local UID of the node 232 is performed prior to any applications 305 being initialized on the node 232.

The mapping of local UID to SCL may be stored in UID/SCL datastore 322 of OS 315. In one exemplary embodiment, node 232 maintains a range of local UIDs (e.g., from 500 to 1500) assigned to applications 305 as they are created on node 232. Prior to any applications 305 starting on node 232, SCL module 320 assigns a unique SCL to each UID in the range. In some embodiments, a transform is applied to each local UID to generate the SCL for that UID. For example, UID #500 is turned into SCL S0:C0, C1, and UID #501 is turned into SCL S0:C0, C2, UID #502 is turned into SCL S0:C0, C3, and so on.

After the unique SCLs are generated and mapped to their associated local UIDs by SCL module 320, server orchestration system 226 may interact with server orchestration system agent 310 to pre-configure Internet Protocol (IP) addresses assigned to node 232 with the unique SCLs. As part of the initial configuration of node 232, the node 232 is assigned a set of IP addresses to be utilized by processes (e.g., applications 305) of the node. For example, a whole class A set of IP addresses may be utilized by node 232, which potentially results in the order of 16 million IP addresses assigned to node 232.

Node 232 may then associate subsets of the assigned IP addresses of the node 232 to each local UID maintained by the node. In one embodiment, each local UID is assigned a class C network of IP addresses from the class A set of IP addresses, which results in around 250 IP addresses. IP address datastore 324 may be used by OS 315 to keep a record of the existing IP addresses for the node 232, as well as a mapping between IP addresses and UIDs. In one embodiment, SCL module 320 then accesses IP address datastore 324 to pre-label IP addresses with SCLs. SCL module 320 may utilize the UID/SCL datastore 322 to match SCLs associated with a UID to the IP addresses for the same UID found in IP address datastore 324. In one embodiment, the IP address datastore 324 then keeps a record of the SCL label applied to each IP address. In some embodiments, pre-configuring the IP addresses with SCLs associated with the UID assigned to the IP addresses prior to initialization of an application 305 on the node 232 can save time in the configuration process of the application 305 itself. In other embodiments, the IP addresses may be associated with SCLs of the application 305 when the application 305 is initialized on the node 232.

In embodiments of the invention, when an application 305 is initialized on node 232, it is assigned a unique local UID. Then, in one embodiment, SCL module 320 accesses the home directory of the application and assigns the unique SCL to all resources found in the home directory. In one embodiment, a change context (CHCON) command may be used to change labels on the files listed in the home directory associated with the UID (i.e., associated with the application 305). When the application 305 begins running on node 232, SCL module 320 associates the unique SCL associated with the local UID of the application 305 to the running process of the application 305 so that the process is run with the SCL. Once the application 305 is running, the IP addresses associated with the local UID of the application 305 may then be utilized (as they were already pre-configured to be associated with the UID) and will already have the associated SCLs assigned.

Utilizing the unique SCL assigned to the combination of the running process of the application 305, the files of the application 305, and the IP address of the application 305, the SCL module 320 may then enforce permissions to access these resources of application 305. The SCL label is used by SCL module 320 to keep applications 305 separated from each other. For example, SCL module 320 ensures that the SCL of a requesting process matches the SCL of any resources (e.g., files and/or IP addresses) that it is requesting to access. If the SCLs do not match, the SCL module 320 denies permission to the requesting process. In some embodiments, each SCL provides a same level of security for each application 305, but prevents applications from accesses resources of other applications 305.

Figure 4:
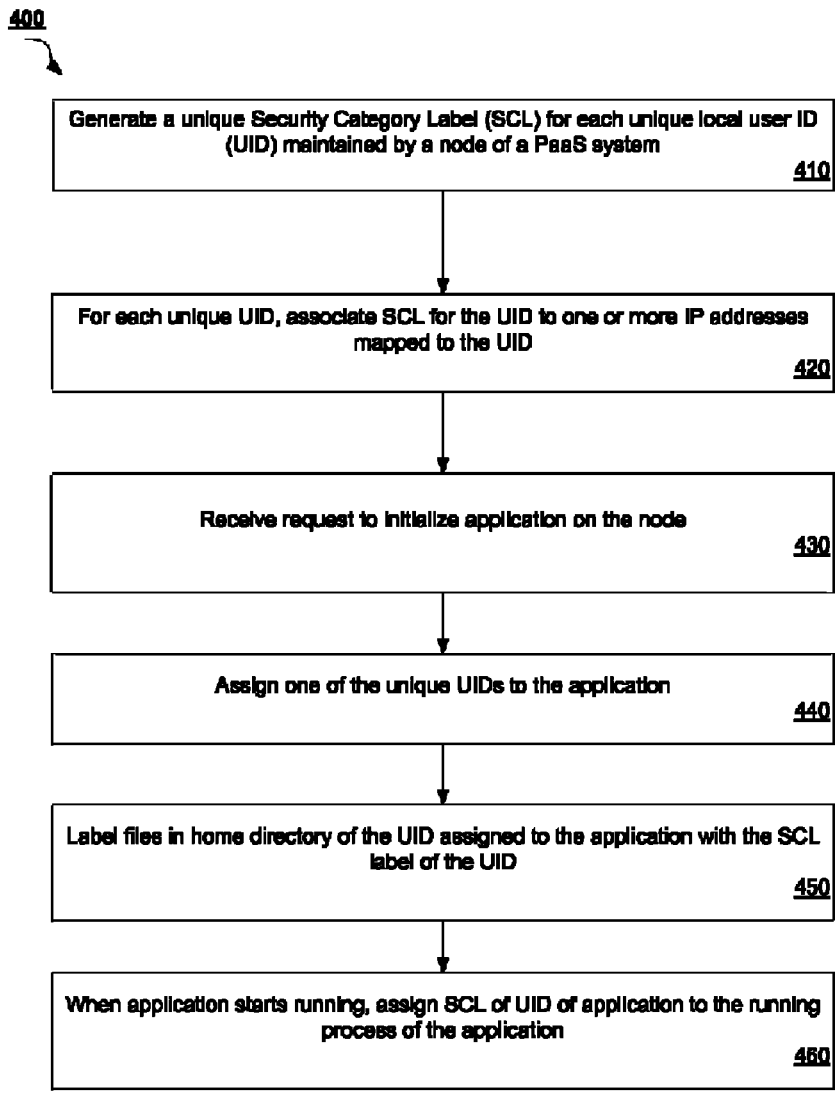
FIG. 4 is a flow diagram illustrating a method for applying security category labels to multi-tenant applications in a PaaS environment of a cloud computing system according to an embodiment of the invention according to an embodiment of the invention.

FIG. 4 is a flow diagram illustrating a method 400 for applying security category labels to multi-tenant applications in a PaaS environment of a cloud computing system according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by a node/VM executing on a computing device, such as node 232 described with respect to FIGS. 2 and 3.

Method 400 begins at block 410 where a unique SCL is generated for each unique local UID maintained by the node of the PaaS system. In one embodiment, a transform is applied to each local UID to generate the unique SCL for that UID. The mapping between UIDs and SCLs is then maintained by a datastore in the OS. At block 420, for each unique UID, the SCL for that UID is associated with one or more IP addresses mapped to the UID. In one embodiment, a mapping of IP addresses to UIDs is utilized to match SCLs to IP addresses. This mapping of IP addresses to SCLs may be maintained in an IP address datastore of the OS of the node.

Then, at block 430, a request to initialize an application on the node is received. In one embodiment, the request is received from a server orchestration system operating on a broker layer of the PaaS system. The application may be initialized on the node utilizing repositories stored on the node. At block 440, a unique local UID of the local UIDs maintained by the node is assigned to the application. At block 450, files of the application found in a home directory of the UID of the application are labeled with the SCL of the UID. Then, at block 460, when the application starts running, the SCL of the UID of the application is assigned to the running process of the application. In one embodiment, a SCL module of the OS, such as SCL module 320 of FIG. 3, may coordinate method 400 on the node.

Figure 5:
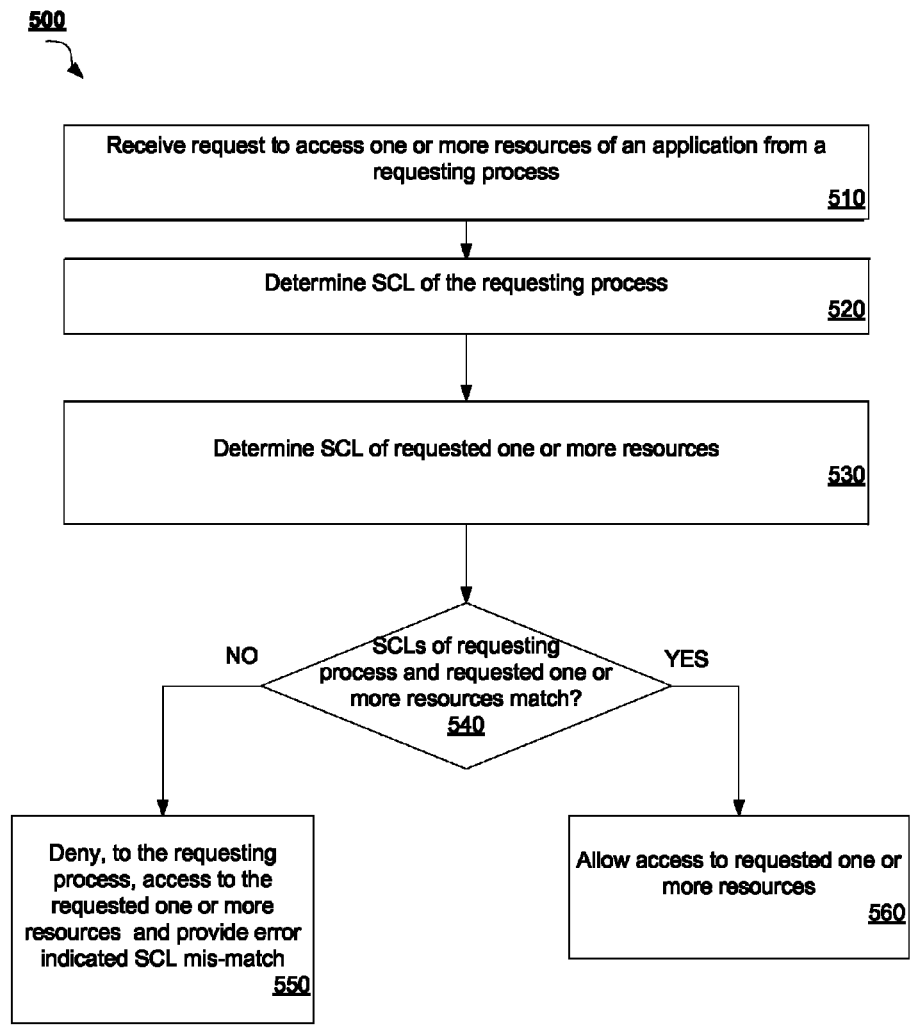
FIG. 5 is a flow diagram illustrating a method for enforcing security category labels of multi-tenant applications in a PaaS environment of a cloud computing system according to an embodiment of the invention according to an embodiment of the invention.

FIG. 5 is a flow diagram illustrating a method 500 for enforcing security category labels of multi-tenant applications in a PaaS environment of a cloud computing system according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by a node/VM executing on a computing device, such as node 232 described with respect to FIGS. 2 and 3.

Method 500 begins at block 510 where a request to access one or more resources of an application is received from a requesting process. In one embodiment, the requesting process is a running process of a multi-tenant application executing on the node. The kernel of an OS of the node may receive the request to access the one or more resources. In another embodiment, an SCL module of the OS, such as SCL module 320 of FIG. 3, receives the request. In one embodiment, the one or more resources include files of an application running on the node or IP addresses of an application running on the node.

At block 520, an SCL of the requesting process is determined. In one embodiment, the SCL may be part of a label identifying the requesting process within the OS. Then, at block 530, an SCL of the requested one or more resources is determined. In one embodiment, the SCL label of the requested one or more resources may be part of a label maintained by the OS in datastore keeping configuration information of the resources.

At decision block 540, it is determined whether the determined SCLs of the requesting process and the requested one or more resources match. If not, then method 500 proceeds to block 550 where access to the one or more requested resources is denied to the requesting process. An error specifically indicating that an SCL mis-match occurred may also be provided to the requesting process as part of the access denial. On the other hand, if the determined SCLs do match at decision block 540, the method 500 proceeds to block 560 where access to the requested one or more resources is allowed.

Figure 6:
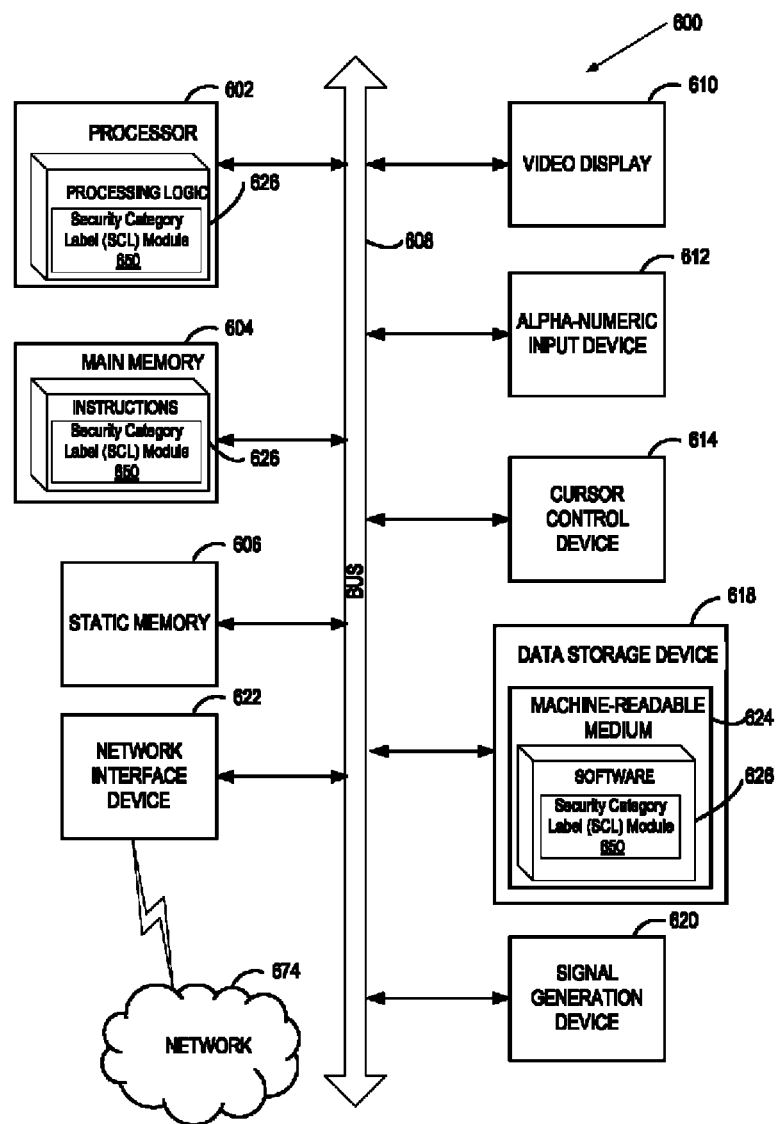
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein, illustrated in FIG. 6 by depicting instructions 626 within processor 602.

The computer system 600 may further include a network interface device 622. The computer system 600 also may include a video display unit 610 (e.g., a liquid crystal display (LCD), a cathode ray tube (CRT), or a touchscreen), an alphanumeric input device 612 (e.g., a keyboard), a cursor control device 614 (e.g., a mouse), and a signal generation device 620 (e.g., a speaker).

The data storage device 618 may include a machine-readable storage medium 624 (also known as a computer-readable storage medium) on which is stored software 626 (e.g., one or more sets of instructions, software, etc.) embodying any one or more of the methodologies or functions described herein. The software 626 may also reside, completely or at least partially, within the main memory 604 (e.g., instructions 626) and/or within the processor 602 (e.g., processing logic 626) during execution thereof by the computer system 600, the main memory 604 and the processor 602 also constituting machine-readable storage media. The software 626 may further be transmitted or received over a network 674 via the network interface device 622.

In one embodiment, the software 626 include instructions for a SCL module 650, which may correspond to SCL module 320 of FIG. 3, and/or a software library containing methods that call the SCL module for applying security category labels to multi-tenant applications in a PaaS cloud computing environment. While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
generating, by a virtual machine (VM) executed by a processing device, a unique security category label (SCL) for each local user identification (UID) maintained by the VM;
for each local UID maintained by the VM, assigning the unique SCL associated with the local UID to one or more Internet Protocol (IP) addresses mapped to the local UID;
receiving, by the VM, a request to initialize an application on the VM, wherein the VM hosts a plurality of applications comprising the application, the plurality of applications comprising multi-tenant applications having different owners;
assigning, by the VM, a local UID of the local UIDs maintained by the VM to the application;
assigning, by the VM, files of the application the unique SCL associated with the local UID of the application; and
assigning, by the VM, the unique SCL associated with the local UID of the application to a running process of the application.

2. The method of claim 1, wherein the files of the application are stored in a home directory of the local UID of the application.

3. The method of claim 1, further comprising:
receiving, from a requesting process, a request to access one or more resources, the one or more resources comprising at least one of the files of the application or the one or more IP addresses mapped to the local UID of the application;
determining an SCL assigned to an application of the requesting process;
determining an SCL assigned to the one or more resources; and
when the SCL of the application of the requesting process matches the SCL assigned to the one or more resources, allowing the requesting process to access the one or more resources.

4. The method of claim 3, wherein when the SCL of the application of the requesting process does not match the SCL assigned to the one or more resources, denying access to the one or more resources by the requesting process.

5. The method of claim 1, wherein the SCLs are Multi-Category Security (MCS) labels.

6. The method of claim 1, wherein the generating a unique SCL for each local UID comprising applying a transform to the local UID to create the unique SCL for the local UID.

7. The method of claim 1, wherein the assigning the unique SCL associated with the local UID to the one or more IP addresses mapped to the local UID is performed subsequent to receiving the request to initialize the application.

8. A system, comprising:
a memory;
a processing device communicably coupled to the memory; and
a virtual machine (VM) to virtualize resources of the memory and the processing device, and an operating system (OS) the VM enabled with a SELinux™ security feature, wherein the VM to:
generate a unique security category label (SCL) for each local user identification (UID) maintained by the VM;
for each local UID maintained by the VM, assign the unique SCL associated with the local UID to one or more Internet Protocol (IP) addresses mapped to the local UID;
receive a request to initialize an application on the VM;
receive a request to initialize an application on the VM, wherein the VM hosts a plurality of applications comprising the application, the plurality of applications comprising multi-tenant applications having different owners;
assign a local UID of the local UIDs maintained by the VM to the application;
assign files of the application the unique SCL associated with the local UID of the application; and
assign the unique SCL associated with the local UID of the application to a running process of the application.

9. The system of claim 8, wherein the files of the application are stored in a home directory of the local UID of the application.

10. The system of claim 8, wherein the VM is further to:
receive, from a requesting process, a request to access one or more resources, the one or more resources comprising at least one of the files of the application or the one or more IP addresses mapped to the local UID of the application;
determine an SCL assigned to an application of the requesting process;
determine an SCL assigned to the one or more resources;
when the SCL of the application of the requesting process matches the SCL assigned to the one or more resources, allow the requesting process to access the one or more resources; and
when the SCL of the application of the requesting process does not match the SCL assigned to the one or more resources, deny access to the one or more resources by the requesting process.

11. The system of claim 8, wherein the SCLs are Multi-Category Security (MCS) labels.

12. The system of claim 8, wherein generating a unique SCL for each local UID comprising applying a transform to the local UID to create the unique SCL for the local UID.

13. The system of claim 8, wherein assigning the unique SCL associated with the local UID to the one or more IP addresses mapped to the local UID is performed subsequent to receiving the request to initialize the application.

14. A non-transitory machine-readable storage medium including instructions that, when accessed by a processing device, cause the processing device to:
generate, by a virtual machine (VM) executed by the processing device, a unique security category label (SCL) for each local user identification (UID) maintained by the VM;
for each local UID maintained by the VM, assign the unique SCL associated with the local UID to one or more Internet Protocol (IP) addresses mapped to the local UID;
receive, by the VM, a request to initialize an application on the VM, wherein the VM hosts a plurality of applications comprising the application, the plurality of applications comprising multi-tenant applications having different owners;
assign, by the VM, a local UID of the local UIDs maintained by the VM to the application;

assign, by the VM, files of the application the unique SCL associated with the local UID of the application; and assign, by the VM, the unique SCL associated with the local UID of the application to a running process of the application.

15. The non-transitory machine-readable storage medium of claim 14, wherein the files of the application are stored in a home directory of the local UID of the application.

16. The non-transitory machine-readable storage medium of claim 14, wherein the processing device is further to:

receive, from a requesting process, a request to access one or more resources, the one or more resources comprising at least one of the files of the application or the one or more IP addresses mapped to the local UID of the application;

determine an SCL assigned to an application of the requesting process;

determine an SCL assigned to the one or more resources; and when the SCL of the application of the requesting process matches the SCL assigned to the one or more resources, allow the requesting process to access the one or more resources; and when the SCL of the application of the requesting process does not match the SCL assigned to the one or more resources, deny access to the one or more resources by the requesting process.

17. The non-transitory machine-readable storage medium of claim 14, wherein the SCLs are Multi-Category Security (MCS) labels.

18. The non-transitory machine-readable storage medium of claim 14, wherein generating a unique SCL for each local UID comprising applying a transform to the local UID to create the unique SCL for the local UID.

19. The non-transitory machine-readable storage medium of claim 14, wherein the assigning the unique SCL associated with the local UID to the one or more IP addresses mapped to the local UID is performed subsequent to receiving the request to initialize the application.

* * * * *